US011036206B2

(12) United States Patent
Abe et al.

(10) Patent No.: US 11,036,206 B2
(45) Date of Patent: Jun. 15, 2021

(54) NUMERICAL CONTROLLER

(71) Applicant: Fanuc Corporation, Yamanashi (JP)

(72) Inventors: Chihiro Abe, Yamanashi (JP); Manabu Saitou, Yamanashi (JP); Takenori Ono, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/725,053

(22) Filed: Dec. 23, 2019

(65) Prior Publication Data
US 2020/0218234 A1    Jul. 9, 2020

(30) Foreign Application Priority Data

Jan. 7, 2019 (JP) .............................. JP2019-000836

(51) Int. Cl.
*G05B 19/4155* (2006.01)
*G05B 19/18* (2006.01)
*G05B 19/416* (2006.01)

(52) U.S. Cl.
CPC ....... *G05B 19/4155* (2013.01); *G05B 19/182* (2013.01); *G05B 19/4163* (2013.01); *G05B 2219/34095* (2013.01)

(58) Field of Classification Search
CPC .......................................... G05B 2219/34095
See application file for complete search history.

(56) References Cited

U.S. PATENT DOCUMENTS

2012/0016514 A1* 1/2012 Nakamura ......... G05B 19/4103
                                                          700/188
2015/0227131 A1* 8/2015 Murakami ............. G05B 19/19
                                                          700/189

FOREIGN PATENT DOCUMENTS

JP        9-288509 A     11/1997
JP        09198116 A  *   7/1999

* cited by examiner

*Primary Examiner* — Ryan A Jarrett
(74) *Attorney, Agent, or Firm* — RatnerPrestia (57) ABSTRACT

A numerical controller for generating block information of a path by analyzing an axis movement command described in a machining program includes a command analysis unit for analyzing the machining program in which the axis movement command for a plurality of sections is described in one block in a reading processing for the one block to specify a plurality of coordinate values, a command synthesis unit for generating a plurality of direction vectors constituting the path based on the plurality of coordinate values and generating a resultant vector obtained by adding the direction vectors, and a block information generation unit for generating the block information based on the resultant vector.

5 Claims, 13 Drawing Sheets

FIG. 1

PROGRAM EXAMPLE

FIG. 2

PREFETCH PROCESSING

CONVENTIONAL

FORMAT EXAMPLE OF AXIS MOVEMENT COMMAND

FIG. 6

EXAMPLE

・EXAMPLE OF COMMAND USING ARRAY TYPE VARIABLE

```
O1001 ;
DEF #ABC[3,10] = [[1,2,3],[2,3,4],[3,4,5], ・・・,[10,11,12]];
N21 G91G00 X,Y,Z=[100.,100.,100.] F400. ;
N22 G01 X,Y,Z=#ABC ;
  ⋮
```

FIG. 8

・EXAMPLE OF GIVING COMMAND BY READING EXTERNAL FILE
 (CSV FORMAT, CAM DATA, ETC.)

```
O1001 ;
N21 G91G00 X,Y,Z=[100.,100.,100.] F400. ;
N22 G01 X,Y,Z=LOAD["PATH1.CSV"] ;
  ⋮
```

PATH1.CSV

·EXAMPLE OF GIVING COMMAND BY READING EXTERNAL FILE
(CSV FORMAT, CAM DATA, ETC.)

```
O1001 ;
N21 G91G00 X,Y,Z=[100.,100.,100.] F400. ;
N22 G01 X,Y,Z=LOAD["CAM_DATA.NC"] ;
 :
```

CAM_DATA.NC

CONVENTIONAL

- S1: READ ONE BLOCK
- S2: ANALYZE PROGRAM
- S3: GENERATE BLOCK INFORMATION FOR ONE LINE SEGMENT
- S4: SWITCH MODAL

NUMERICAL CONTROLLER

RELATED APPLICATIONS

The present application claims priority to Japanese Patent Application Number 2019-000836 filed Jan. 7, 2019, the disclosure of which is hereby incorporated by reference herein in its entirety.

BACKGROUND OF THE INVENTION

1. Field of the Invention

The present disclosure relates to a numerical controller, and particularly relates to a numerical controller that realizes efficient performance of a synthesis processing for blocks in a continuous axis control command.

2. Description of the Related Art

Figure 1:
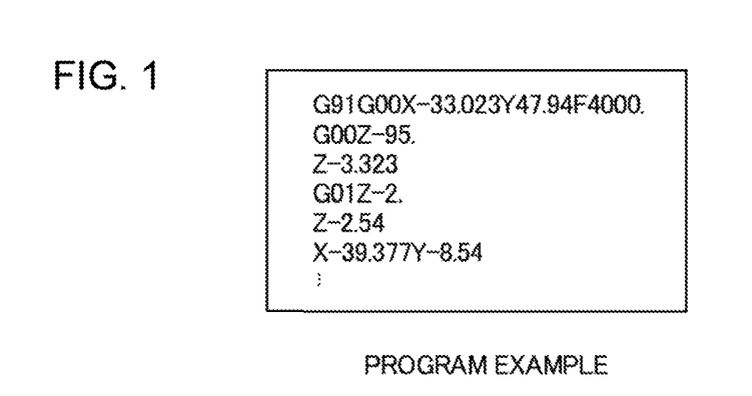
FIG. 1 is a diagram illustrating an example of a conventional machining program.

In a machining program (NC program) executed by a numerical controller, one line segment or arc movement command is normally described for each block. Therefore, when a machining path including a plurality of line segments or arcs is commanded, it is necessary to describe the axis movement command continuously over a plurality of blocks (see FIG. 1).

In addition, the numerical controller normally reads command blocks described in the NC program successively from a head to analyze a program, generates block information, performs interpolation processing based on the block information, and creates a distribution pulse of each axis.

Figure 2:
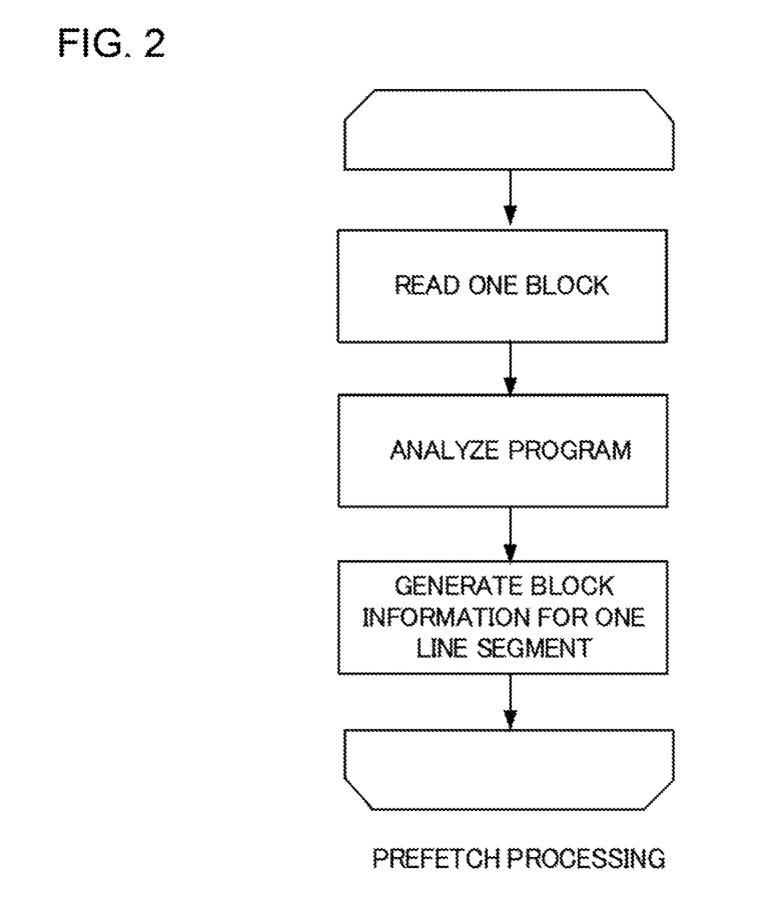
FIG. 2 is a diagram illustrating an example of conventional prefetch processing.

To obtain an excellent machined surface, the numerical controller needs to continuously create and output the distribution pulse without interruption. For this reason, the numerical controller needs to complete creation of block information necessary for interpolation prior to interpolation processing. Therefore, the numerical controller normally starts reading each block of the NC program before a command described in the block is executed, and analyzes all commands included in the NC program, which is referred to as prefetch processing (see FIG. 2).

When a workpiece is machined into a complicated shape, the number of blocks of an axis movement command included in the NC program tends to increase. In the NC program having a large number of blocks, when an operator, etc. desires to check a rough machining path or machining flow by performing a test operation, etc., the numerical controller needs to analyze all the blocks and calculate a path. Therefore, there is a problem that processing in the numerical controller takes a large amount of time.

Conventionally, there has been a known numerical controller that reduces the number of program blocks by synthesizing program blocks within an allowable tolerance (for example, JP 9-288509 A, etc.).

However, in a method described in JP 9-288509 A, each time one block of a program is read, it is necessary to determine whether the read block corresponds to a linear interpolation block. In addition, there is a limit to the number of blocks that can be synthesized depending on the maximum number of blocks of prefetch processing.

Therefore, there is a demand for a numerical controller that realizes efficient performance of a synthesis processing for blocks in a continuous axis control command.

SUMMARY OF THE INVENTION

A numerical controller according to an embodiment of the disclosure is a numerical controller for generating block information of a path by analyzing an axis movement command described in a machining program, the numerical controller including a command analysis unit for analyzing the machining program in which the axis movement command for a plurality of sections is described in one block in a reading processing for the one block to specify a plurality of coordinate values, a command synthesis unit for generating a plurality of direction vectors constituting the path based on the plurality of coordinate values and generating a resultant vector obtained by adding the direction vectors, and a block information generation unit for generating the block information based on the resultant vector.

In the numerical controller according to the embodiment of the disclosure, the command synthesis unit generates the resultant vector when a tolerance related to the resultant vector is less than a predetermined allowable value.

In the numerical controller according to the embodiment of the disclosure, the command synthesis unit generates the resultant vector when a length of the resultant vector is less than a predetermined allowable value.

In the numerical controller according to the embodiment of the disclosure, the command synthesis unit generates the resultant vector when a plurality of the axis movement commands includes the same feed speed or main axis rotating speed.

In the numerical controller according to the embodiment of the disclosure, the command synthesis unit generates the resultant vector when a plurality of the axis movement commands includes a specific and the same G code, T code, or mode command.

According to an aspect of the disclosure, it is possible to provide a numerical controller that realizes efficient performance of a synthesis processing for blocks in a continuous axis control command.

BRIEF DESCRIPTION OF THE DRAWINGS

An object and feature of the disclosure will be apparent from description of an embodiment below with reference to accompanying drawings. In the drawings.

DETAILED DESCRIPTION OF THE PREFERRED EMBODIMENTS

Figure 3:
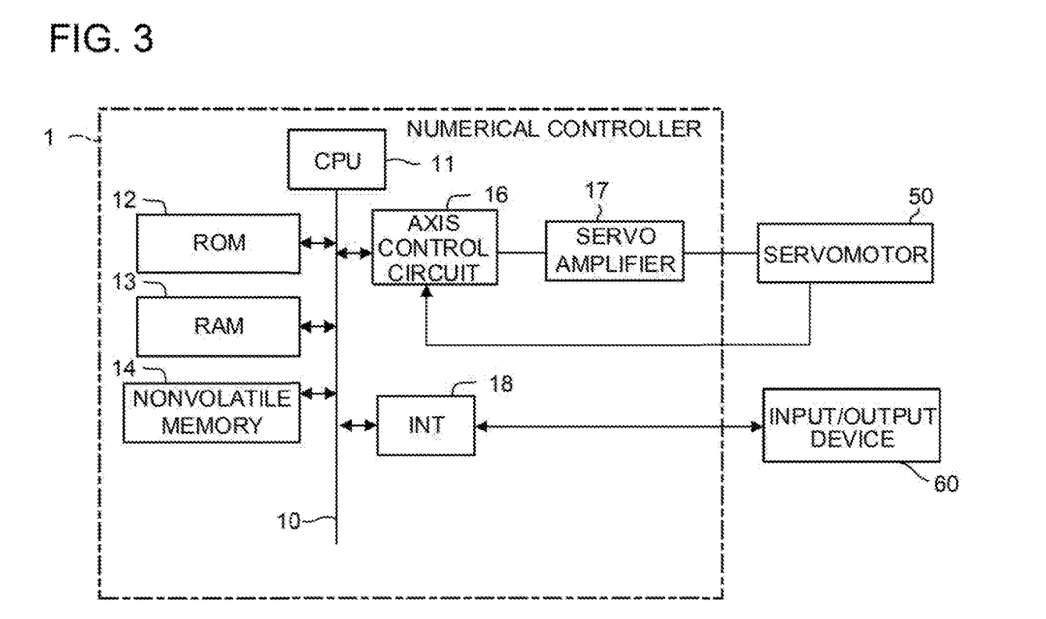
FIG. 3 is a diagram illustrating a hardware configuration example of a numerical controller.

FIG. 3 is a schematic hardware configuration diagram illustrating a numerical controller 1 according to an embodiment. The numerical controller 1 is a device that controls an industrial machine including a machine tool. The numerical controller 1 includes a central processing unit (CPU) 11, a read only memory (ROM) 12, a random access memory (RAM) 13, a nonvolatile memory 14, a bus 10, an axis control circuit 16, a servo amplifier 17, and an interface 18. A servomotor 50 and an input/output device 60 are connected to the numerical controller 1.

The CPU 11 is a processor that controls the numerical controller 1 as a whole. The CPU 11 reads a system program stored in the ROM 12 via the bus 10. The CPU 11 controls the entire numerical controller 1 according to the system program.

For example, the ROM 12 stores in advance a system program for executing various controls of a machine.

The RAM 13 temporarily stores calculation data or display data, and data, a program, or the like input by an operator via the input/output device 60.

For example, the nonvolatile memory 14 is backed up by a battery (not illustrated). The nonvolatile memory 14 maintains a storage state even when a power source of the numerical controller 1 is turned off. The nonvolatile memory 14 stores data, a program, etc. input from the input/output device 60. The program and data stored in the nonvolatile memory 14 may be loaded in the RAM 13 during execution and use.

The axis control circuit 16 controls an operating axis of the machine. The axis control circuit 16 receives a movement command amount of the axis output by the CPU 11 and outputs a movement command of the operating axis to the servo amplifier 17.

The servo amplifier 17 receives the axis movement command output by the axis control circuit 16 and drives the servomotor 50.

The servomotor 50 is driven by the servo amplifier 17 to move the operating axis of the machine. In the present embodiment, a spindle is moved by the servomotor 50. For example, the servomotor 50 has a position/speed detector. The position/speed detector outputs a position/speed feedback signal. This position/speed feedback signal is fed back to the axis control circuit 16 so that position/speed feedback control is performed.

Incidentally, in FIG. 3, only one set of an axis control circuit 16, a servo amplifier 17, and a servomotor 50 is illustrated. However, in practice, the set is prepared for each axis provided in the machine to be controlled.

The input/output device 60 is a data input/output device including a display, a hardware key, etc. For example, the input/output device 60 is an MDI unit or an operation panel. The input/output device 60 displays information received from the CPU 11 via the interface 18 on a display. The input/output device 60 passes a command, data, etc. input from a hardware key, etc. to the CPU 11 via the interface 18.

Figure 15:
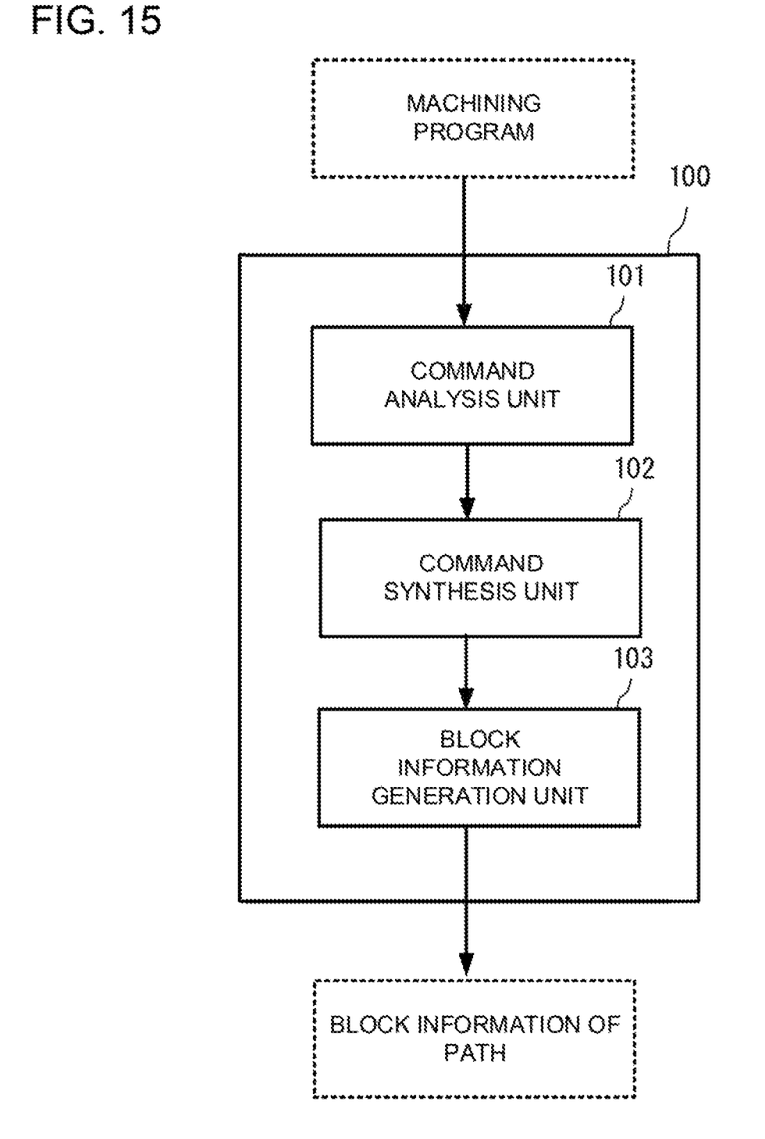
FIG. 15 is a diagram illustrating a functional configuration example of the numerical controller.

FIG. 15 is a block diagram illustrating an outline of a functional configuration of the numerical controller 1. The numerical controller 1 includes a command analysis unit 101, a command synthesis unit 102, and a block information generation unit 103.

The command analysis unit 101 reads and analyzes a machining program including an axis movement command that can define line segments of a plurality of sections using a command of one block. The command analysis unit 101 specifies all coordinate points as movement destinations based on an analysis result of the machining program. When there is a plurality of coordinate points specified by the command analysis unit 101, the command synthesis unit 102 performs a processing of synthesizing vectors constituting a machining path. The block information generation unit 103 generates block information of the machining path indicated by a vector synthesized by the command synthesis unit 102.

Figure 4:
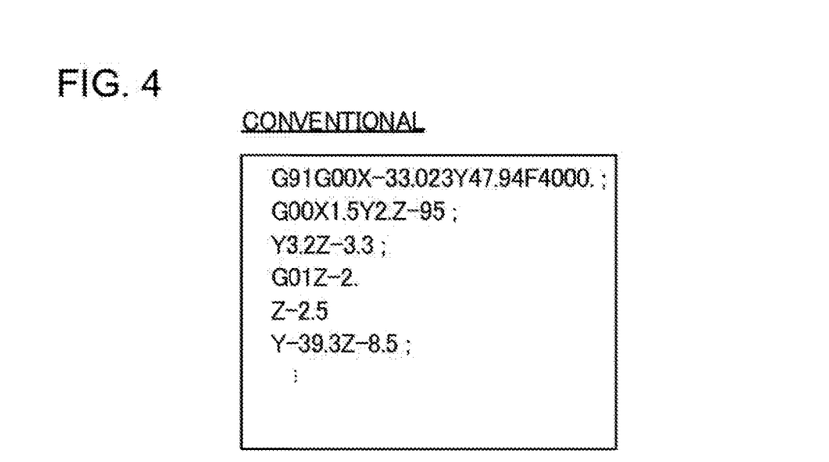
FIG. 4 is a diagram illustrating an example of a conventional axis movement command.

A specification of the axis movement command of the present embodiment that can be analyzed by the command analysis unit 101 will be described with reference to FIG. 4 to FIG. 6. FIG. 4 is a diagram illustrating an example of a conventional axis movement command. The axis movement command includes a combination of an address indicated by alphabets (G, X, Y, Z, etc.) and a command value indicated by numbers. Commands such as G91 and G00 are referred to as G codes. G code causes the numerical controller 1 to execute a preparation function for performing machining. A command such as F4000. is a movement command. A numerical value of the movement command indicates a feed speed. Each command such as X1.5, Y2., and Z-95 designates a coordinate value or a movement amount of an X-axis, a Y-axis, and a Z-axis. According to a conventional description method for the axis movement command, in principle, only one line segment can be expressed by one block (one line of the machining program).

On the other hand, in the axis movement command of the present embodiment, content corresponding to a command for a plurality of conventional blocks can be described using a command of one block. This axis movement command has the following features.

(1) Within a command of one block, it is possible to designate a plurality of command values (coordinate values, movement amounts, etc.) corresponding to each address.

(2) A correlation between an address and a command value is described according to a predetermined rule. The rule is not particularly limited. For example, the following rules are present.

(a) A correlation between an address and a plurality of command values is defined by a plurality of types of predetermined delimiters. For example, in an example of FIG. 5, a set of command values for each section is defined by "[" and "]" (square brackets). In addition, "," (comma) indicates a delimiter between command values of each address. That is, [x1, y1, z1] is a command value group that defines a line segment in a first section, x1 is an X-axis command value, y1 is a Y-axis command value, and z1 is a Z-axis command value. Similarly, [x2, y2, z2] is a command value group that defines a line segment in a second section, and [x3, y3, z3] is a command value group that defines a line segment in a third section.

Figure 5:
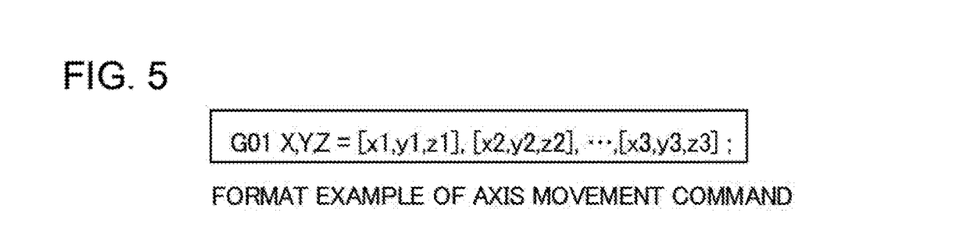
FIG. 5 is a diagram illustrating an example of an axis movement command in the present embodiment.
Figure 6:
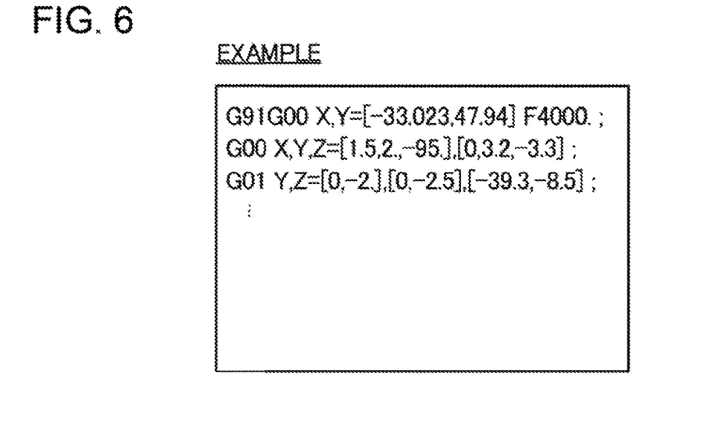
FIG. 6 is a diagram illustrating an example of an axis movement command in the present embodiment.

FIG. 6 is an axis movement command described according to a format illustrated in FIG. 5. Content described in FIG. 6 is equivalent to the axis movement command according to a conventional description method illustrated in FIG. 4. Axis movement commands described from a second line to a third line in FIG. 4 are integrated in a second line in FIG. 6. Similarly, axis movement commands described from a fourth line to a sixth line in FIG. 4 are integrated in a third line in FIG. 6. In the present embodiment, it is possible to integrate conventional commands for a plurality of blocks into a command for one block.

(b) Correlations between addresses and a plurality of command values are defined by predetermined delimiters and numerical order. For example, a command value group x1, y1, and z defining line segments in a first section (x1 is a command value on the X-axis, y1 is a command value on the Y-axis, and z1 is a command value on the Z-axis), a command value group x2, y2, and z2 defining line segments in a second section (x2 is a command value on the X-axis, y2 is a command value on the Y-axis, and z2 is a command value on the Z-axis), . . . , a command value group xn, yn, and zn defining line segments in an n-th section (xn is a command value on the X-axis, yn is a command value on the Y-axis, and zn is a command value on the Z-axis) can also be collectively described for each section as follows.

X, Y, Z =x1, y1, z1, x2, y2, z2, . . . , xn, yn, zn

Alternatively, the command value groups can also be collectively described for each address as follows.

Figure 7:
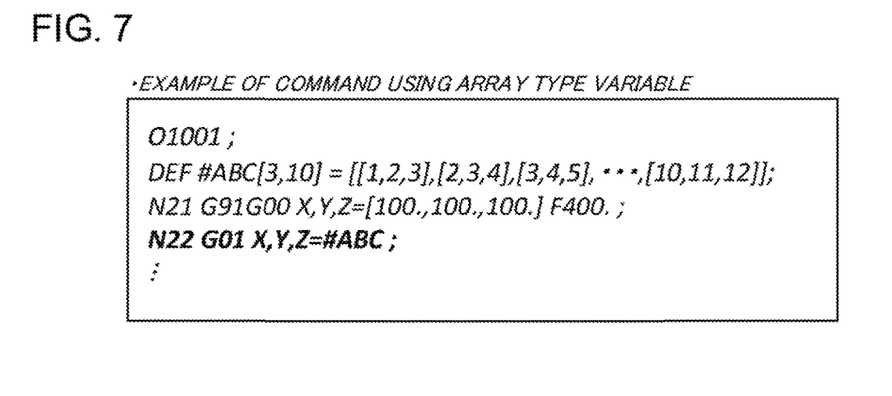
FIG. 7 is a diagram illustrating an example of an axis movement command in the present embodiment.

X, Y, Z=x1, x2, . . . , xn, y1, y2, . . . , yn, z1, z2, . . . , zn (c) The command shown in the above item (a) or (b) can also be described using an array type variable. FIG. 7 (second line and fourth line) is an example in which the following axis movement command A is rewritten using an array type variable. The axis movement command A is described according to a format shown in FIG. 5. In FIG. 7, a right side of the axis movement command A is stored in advance in an array type variable (second line), and the command is described in a form referring to the variable (fourth line).

Axis movement command A:
N22 G01 X, Y, Z=[1, 2, 3], [2, 3, 4], [3, 4, 5], . . . , [10, 11, 12];

(d) A command shown in the above item (a) or (b) can also be described using an external file reference.

Figure 8:
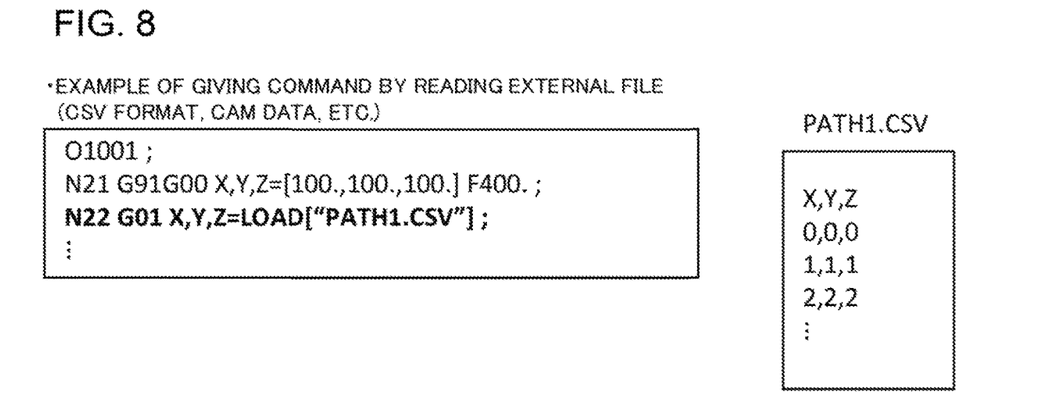
FIG. 8 is a diagram illustrating an example of an axis movement command in the present embodiment.

FIG. 8 (third line) is an example in which the following axis movement command B is rewritten using an external file reference. The axis movement command B is described according to a format shown in FIG. 5. In FIG. 8, content corresponding to a right side of the axis movement command B is described in advance in an external file (PATH1.csv), and the command is described in a form referring to content of the file (third line).

Figure 9:
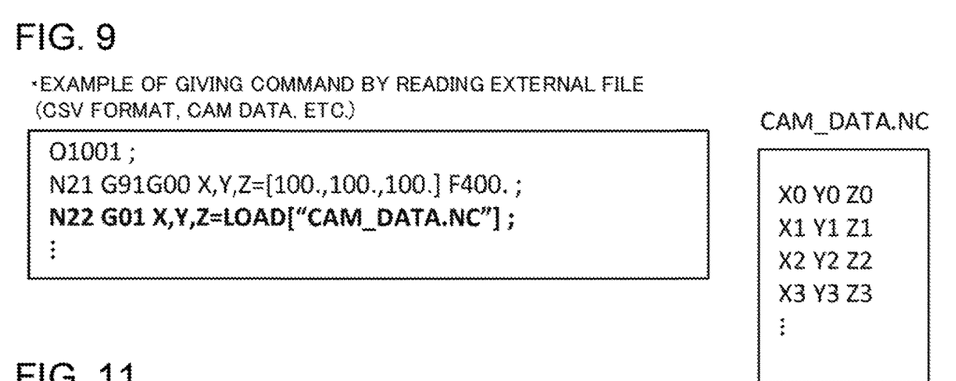
FIG. 9 is a diagram illustrating an example of an axis movement command in the present embodiment.

Axis movement command B:
N22 G01 X, Y, Z=[0, 0, 0], [1, 1, 1], [2, 2, 2], . . . ;

Similarly, FIG. 9 (third line) is an example in which the following axis movement command C is rewritten using an external file reference. The axis movement command C is described according to a format shown in FIG. 5. In FIG. 9, content corresponding to a right side of the axis movement command C is described in advance in an external file (CAM_DATA.NC), and the command is described in a form referring to content of the file (third line).

Axis movement command C:
N22 G01 X, Y, Z=[X0, Y0, Z0], [X1, Y1, Z1], [X2, Y2, Z2], [X3, Y3, Z3], . . . ;

A file format of the external file or a format of the axis movement command may be any file format or format as long as a correlation with the command content before rewriting is maintained. However, it is necessary that the command analysis unit 101 can recognize the correlation and restore the command content before rewriting.

Figure 10:
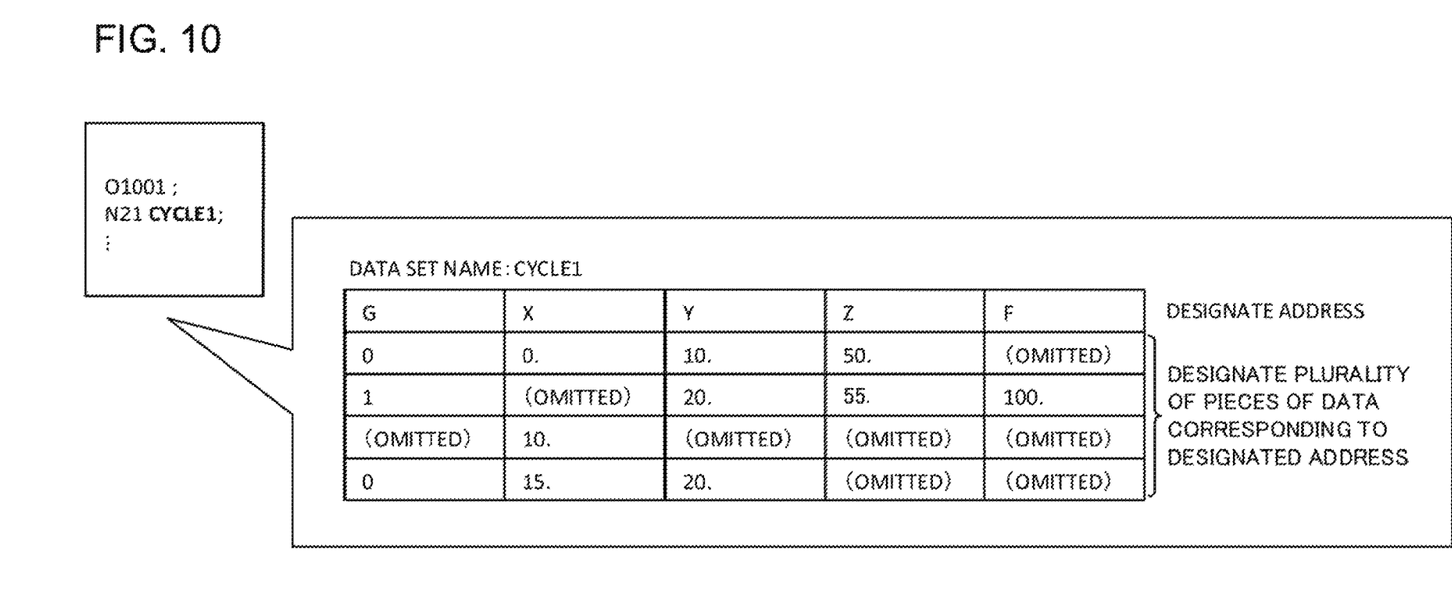
FIG. 10 is a diagram illustrating an example of an axis movement command in the present embodiment.

(e) A command can also be described in a form referring to data set. FIG. 10 (second line) is an example in which the following axis movement command D is rewritten into a format referring to a data set. In FIG. 10, content of a part following N21 of the axis movement command D is stored in advance in a data set (for example, a structure) (CYCLE1), and the command is described in a form referring to content of the data set (second line).

Axis movement command D:
N21 G00 X0. Y10. Z50.;
G01 Y20. Z55. F100.;
X10.;
G00 X15. Y20.;

The format of the data set may be any format as long as a correlation with the command content before rewriting is maintained. However, it is necessary that the command analysis unit 101 can recognize the correlation and restore the command content before rewriting. Even when a data set is used, an address is described only once in the data set.

(3) For an address having no change in a command value, command description may be omitted. For example, in an example of FIG. 6, when the Z-axis does not move (first line), only the commands related to the X-axis and the Y-axis are described, and no command is described for the Z-axis. Similarly, when the X-axis does not move (third line), only commands related to the Y-axis and the Z-axis are described in this block, and no command is described for the X-axis.

(4) A command value (numerical value) may be omitted while defining an axis address. For example, the axis movement command F can be described as follows.

Axis movement command F:
G01 X, Y=[0, 0], [1, ], [, 2], . . .

This command is obtained by integrating and describing an axis movement command G, which has been described as the follows in a conventional description method, into one line.

Axis movement command G:
G01 X0 Y0;
G01 X1;
G01 Y2;

The processing of synthesizing the vectors constituting the machining path will be described in detail with reference to FIG. 16 to FIG. 19. In normal machining, machining is performed according to a machining path formed by successively connecting coordinate points specified by the command analysis unit 101. Meanwhile, when the operator, etc. desires to check a rough machining path or machining flow during test operation, etc., several direction vectors constituting the machining path are synthesized (path synthesis processing), and a simplified machining path is generated. In this way, the operation is performed based on the simplified machining path. In examples illustrated in FIG. 16 and FIG. 17, the command synthesis unit 102 determines whether to execute the path synthesis processing based on tolerance. In examples illustrated in FIG. 18 and FIG. 19, the command synthesis unit 102 determines whether to execute the path synthesis processing based on a path length.

(A) Path synthesis processing based on tolerance

The tolerance Tr refers to a distance between a connection point of two direction vectors and a resultant vector when the resultant vector is generated by synthesizing the two direction vectors constituting the machining path. For example, when a direction vector from a start point to coordinates [x1, y1] and a direction vector from the coordinates [x1, y1] to coordinates [x2, y2] are synthesized to generate a resultant vector from the start point to the coordinates [x2, y2], a distance from the coordinates [x1, y1] to the resultant vector corresponds to the tolerance Tr (see FIG. 17).

In this processing, a resultant vector is generated when the tolerance Tr is less than a predetermined threshold value. On the other hand, when the tolerance Tr is equal to or greater than the predetermined threshold value, no resultant vector is generated. Due to this limitation, a simplified machining path is generated without greatly deviating from an original machining path.

Figure 16:
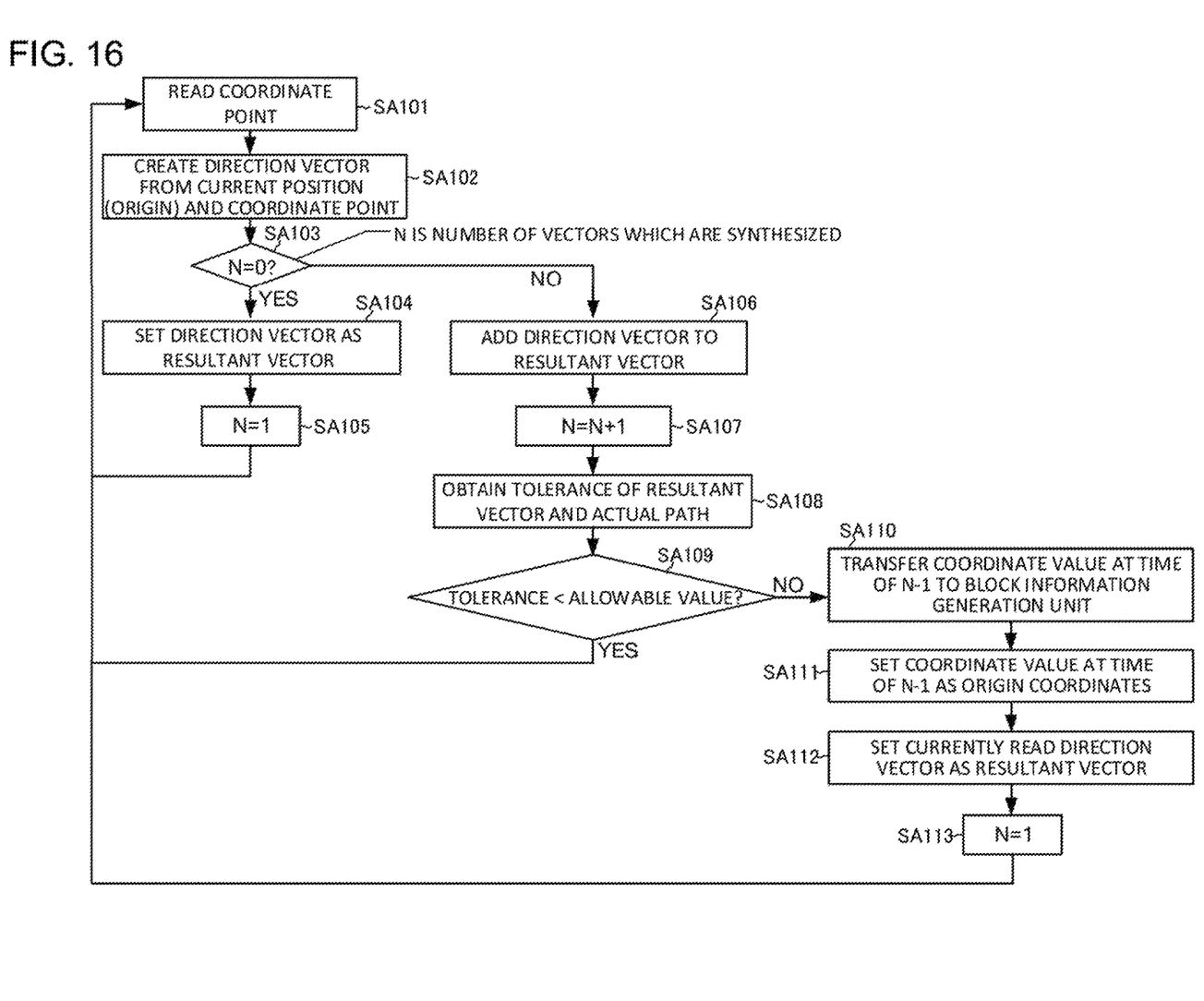
FIG. 16 is a diagram illustrating an example of a machining path synthesis processing by a command synthesis unit.

FIG. 16 is a flowchart for description of the path synthesis processing performed based on the tolerance. The command synthesis unit 102 reads a coordinate point having an earliest machining order among the plurality of coordinate points specified by the command analysis unit 101 (SA101). The command synthesis unit 102 generates a direction vector to the read coordinate point using a current position (start point) as an origin (SA102). In addition, the command synthesis unit 102 stores the generated direction vector as a first resultant vector (SA103 to SA104).

Figure 17:
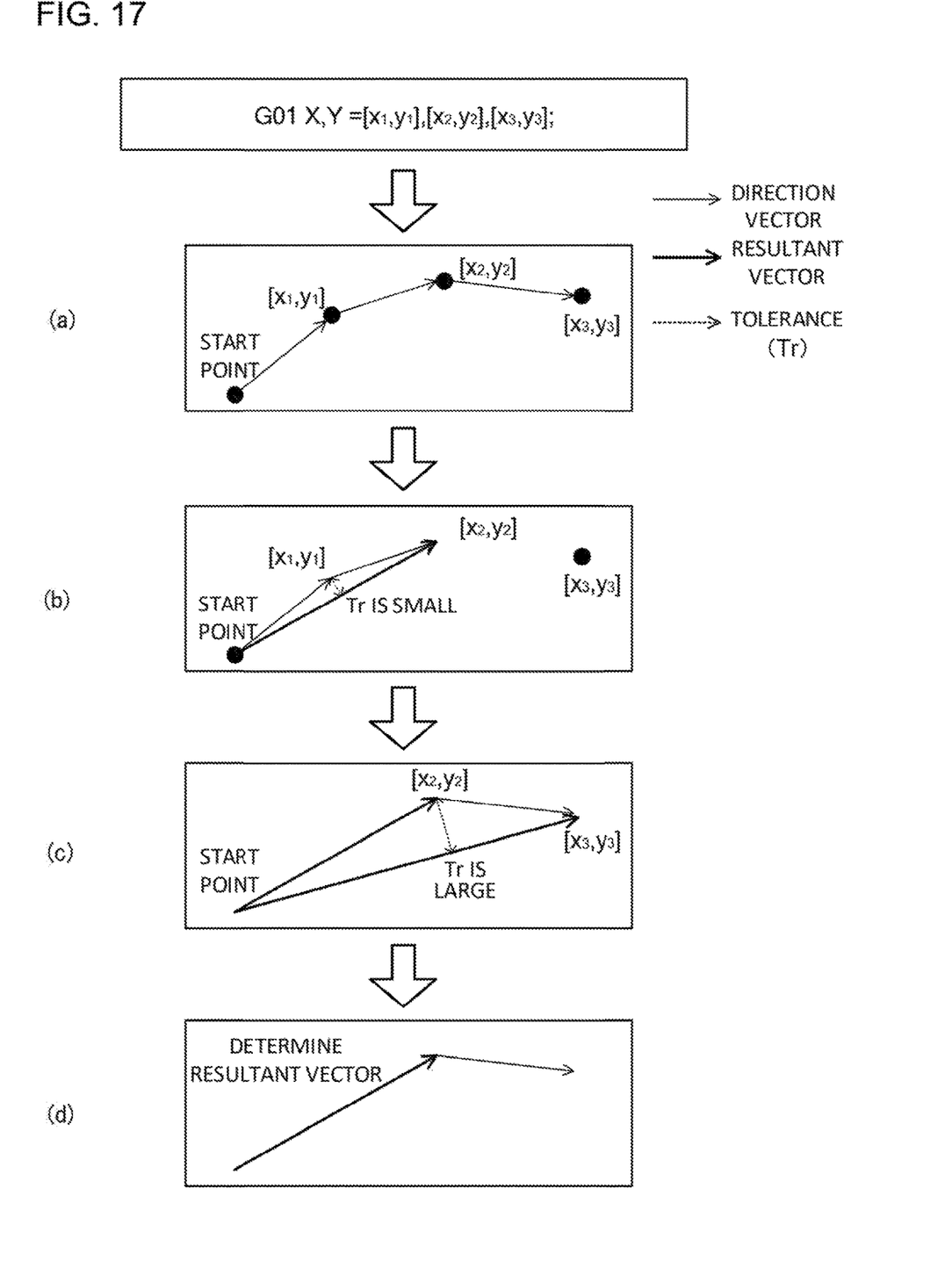
FIG. 17 is a diagram illustrating an example of the machining path synthesis processing by the command synthesis unit.

In an example illustrated in (a) of FIG. 17, the command analysis unit 101 specifies a plurality of coordinate points based on the following axis movement command H.

Axis movement command H:
G01 X, Y=[x1, y1], [x2, y2], [x3, y3];
The following three coordinate points are specified by the axis movement command H.
[x1, y1]
[x2, y2]
[x3, y3]

The command synthesis unit 102 first reads the coordinates [x1, y1] among these coordinates, and generates a direction vector from the start point, that is, the current position to the coordinates [x1, y1]. In addition, the command synthesis unit 102 stores the generated direction vector as a first resultant vector.

Subsequently, the command synthesis unit 102 reads a coordinate point of a subsequent machining order using the coordinate point read in SA101 as a new origin (SA101), and generates a direction vector from the origin to the read coordinate point (SA102).

In the example illustrated in (a) of FIG. 17, the command synthesis unit 102 reads the coordinates [x2, y2] and generates a direction vector from the origin [x1, y1] to the coordinates [x2, y2].

The command synthesis unit 102 adds the generated direction vector to the first resultant vector to generate a new resultant vector (SA103 to SA107).

In an example illustrated in (b) of FIG. 17, the first resultant vector from the start point to the coordinates [x1, y1] and the direction vector from the coordinates [x1, y1] to the coordinates [x2, y2] are added to generate a new resultant vector from the start point to the coordinates [x2, y2].

The command synthesis unit 102 calculates the tolerance Tr related to the synthesis processing, that is, a distance between a connection point of two vectors corresponding to basis of the new resultant vector and the new resultant vector (SA108).

In the example illustrated in (b) of FIG. 17, a connection point between two vectors (the first resultant vector from the start point to the coordinates [x1, y1] and the direction vector from the coordinates [x1, y1] to the coordinates [x2, y2]) corresponding to basis of the new resultant vector (new resultant vector from the start point to the coordinates [x2, y2]) corresponds to [x1, y1]. Therefore, the command synthesis unit 102 calculates the distance Tr between a point indicated by the coordinates [x1, y1] and the new resultant vector.

The command synthesis unit 102 compares the tolerance Tr with an allowable value (threshold value) (SA109). When the tolerance Tr is less than a predetermined allowable value, the command synthesis unit 102 repeats processing of SA101 to SA108, further reads a new coordinate point, and generates a new resultant vector.

For example, when the tolerance Tr illustrated in (b) of FIG. 17 is less than the allowable value, the command synthesis unit 102 reads a new coordinate point [x3, y3], and generates a direction vector from the previously read coordinate point [x2, y2] to the newly read coordinate point [x3, y3]. The command synthesis unit 102 adds the newly generated direction vector and the previously generated resultant vector to generate a new resultant vector from the start point to the coordinates [x3, y3].

On the other hand, when the tolerance Tr is equal to or greater than the predetermined allowable value, the command synthesis unit 102 discards the currently generated resultant vector and transfers the previously generated resultant vector to the block information generation unit 103. In this way, a path indicated by the previously generated resultant vector is adopted as a simple machining path. Further, the command synthesis unit 102 sets the previously read coordinate value as an origin, and sets the currently generated direction vector as the first resultant vector (SA111 to SA113). Hereinafter, the same processing is repeated for the plurality of coordinate points specified by the command analysis unit 101.

For example, when the tolerance Tr illustrated in (c) of FIG. 17 is equal to or greater than the allowable value, the command synthesis unit 102 discards the currently generated resultant vector (a new resultant vector from the start point to the coordinates [x3, y3]). In addition, the command synthesis unit 102 determines a path indicated by the previously generated resultant vector (resultant vector from the start point to the coordinates [x2, y2]) as the machining path ((d) of FIG. 17).

(B) Path synthesis processing based on path length

A path length refers to a length of a resultant vector when the resultant vector is generated by synthesizing two direction vectors constituting a machining path. For example, a direction vector from the start point to the coordinates [x1, y1] and a direction vector from the coordinates [x1, y1] to the coordinates [x2, y2] are synthesized to generate a resultant vector from the start point to the coordinates [x2, y2]. In this case, a distance from the start point to the coordinates [x2, y2] is the path length (see FIG. 19).

In this processing, the resultant vector is generated when the path length is less than a predetermined threshold value. On the other hand, when the path length is greater than or equal to the predetermined threshold, no resultant vector is generated. Due to this limitation, a simplified machining path is generated without greatly deviating from an original machining path.

Figure 18:
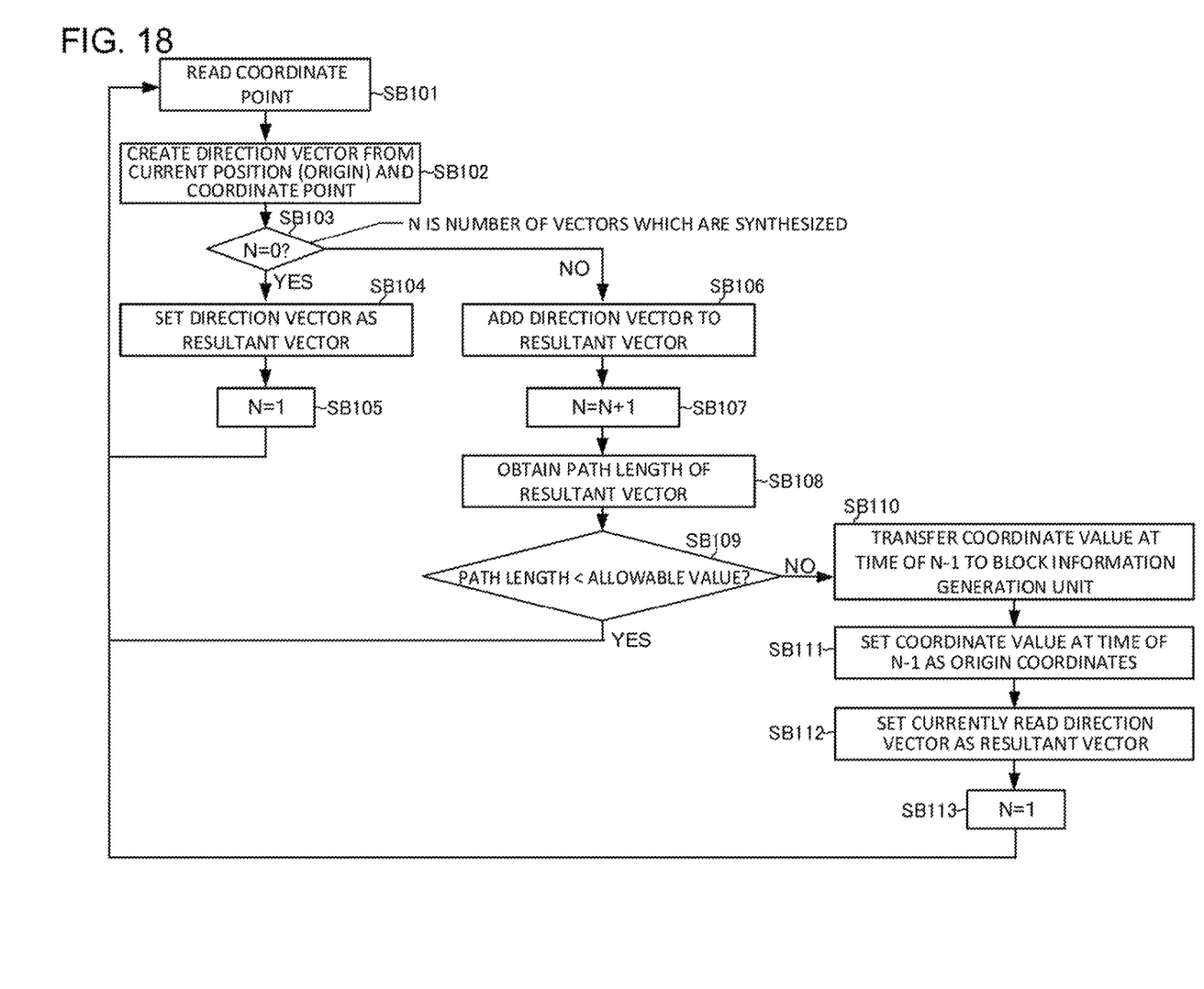
FIG. 18 is a diagram illustrating an example of the machining path synthesis processing by the command synthesis unit.

FIG. 18 is a flowchart for description of a path synthesis processing performed based on the path length. The command synthesis unit 102 reads a coordinate point having an earliest machining order among the plurality of coordinate points specified by the command analysis unit 101 (SB101). The command synthesis unit 102 generates a direction vector to the read coordinate point using a current position (start point) as an origin (SB102). In addition, the command synthesis unit 102 stores the generated direction vector as the first resultant vector (SB103 to SB104).

Figure 19:
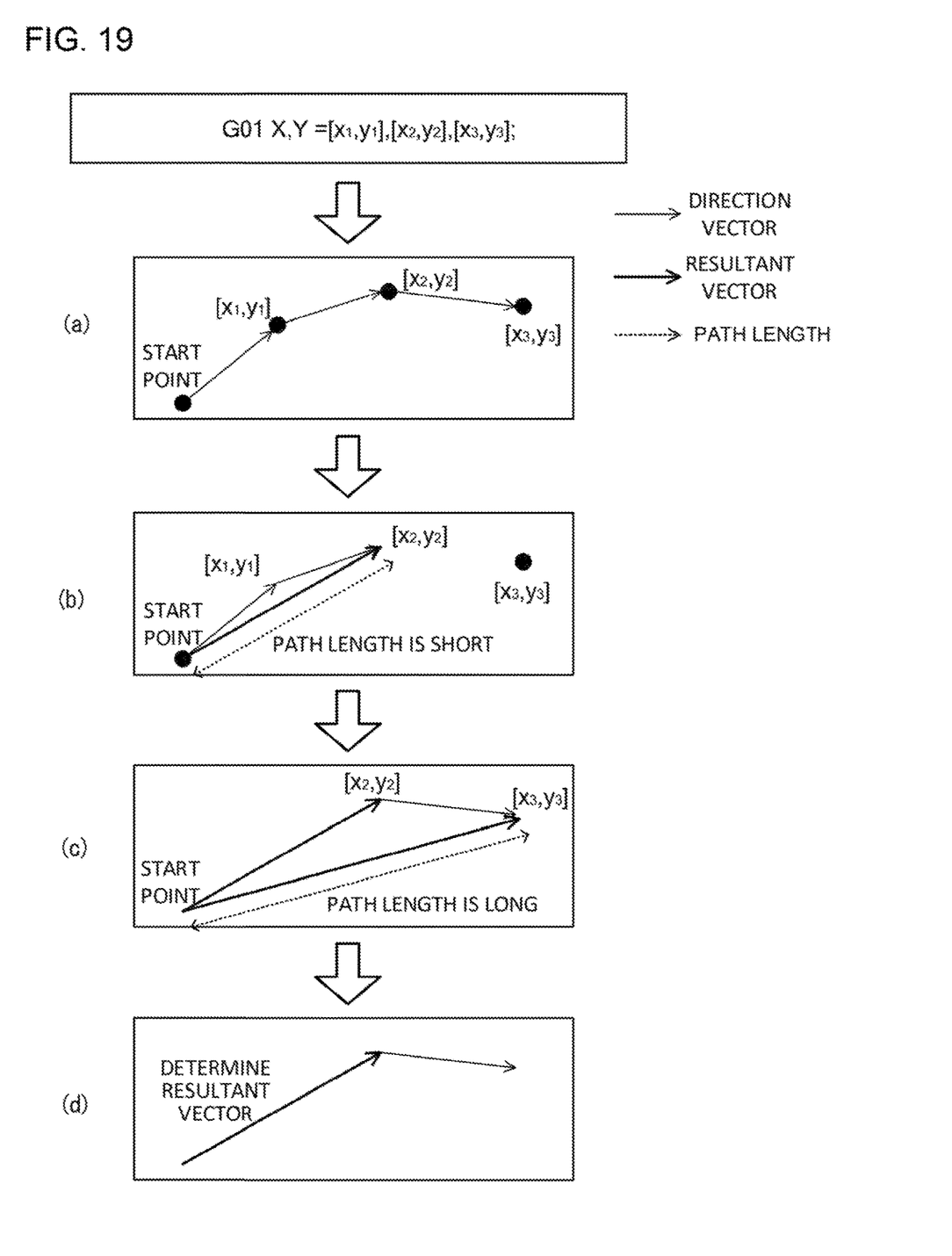
FIG. 19 is a diagram illustrating an example of the machining path synthesis processing by the command synthesis unit.

In an example illustrated in (a) of FIG. 19, the command analysis unit 101 specifies a plurality of coordinate points based on the following axis movement command I.

Axis movement command I:
G01 X, Y=[x1, y1], [x2, y2], [x3, y3];

The following three coordinate points are specified by the axis movement command I.

[x1, y1]
[x2, y2]
[x3, y3]

The command synthesis unit 102 first reads the coordinates [x1, y1] among these coordinates, and generates a direction vector from the start point, that is, the current position to the coordinates [x1, y1]. In addition, the command synthesis unit 102 stores the generated direction vector as a first resultant vector.

Subsequently, the command synthesis unit 102 reads a coordinate point of a subsequent machining order using the coordinate point read in SB101 as a new origin (SB101), and generates a direction vector from the origin to the read coordinate point (SB102).

In the example illustrated in (a) of FIG. 19, the command synthesis unit 102 reads the coordinates [x2, y2] and generates a direction vector from the origin [x1, y1] to the coordinates [x2, y2].

The command synthesis unit 102 adds the generated direction vector to the first resultant vector to generate a new resultant vector (SB103 to SB107).

In an example illustrated in (b) of FIG. 19, the command synthesis unit 102 adds the first resultant vector from the start point to the coordinates [x1, y1] and the direction vector from the coordinates [x1, y1] to the coordinates [x2, y2] to generate a new resultant vector from the start point to the coordinates [x2, y2].

The command synthesis unit 102 calculates a path length of the new resultant vector generated by this synthesis processing (SB108).

In the example illustrated in (b) of FIG. 19, the command synthesis unit 102 calculates the length of the new resultant vector (new resultant vector from the start point to the coordinates [x2, y2]).

The command synthesis unit 102 compares the path length with an allowable value (threshold value) (SB109). When the path length is less than a predetermined allowable value, the command synthesis unit 102 repeats processing of SB101 to SB108, further reads a new coordinate point, and generates a new resultant vector.

For example, when the path length illustrated in (b) of FIG. 19 is less than the allowable value, the command synthesis unit 102 reads a new coordinate point [x3, y3], and generates a direction vector from the previously read coordinate point [x2, y2] to the newly read coordinate point [x3, y3]. In addition, the command synthesis unit 102 adds this direction vector and the previously generated resultant vector to generate a new resultant vector from the start point to the coordinates [x3, y3].

On the other hand, when the path length is equal to or greater than the predetermined allowable value, the command synthesis unit 102 discards the currently generated resultant vector and transfers the previously generated resultant vector to the block information generation unit 103. In this way, a path indicated by the previously generated resultant vector is adopted as a simple machining path.

Further, the command synthesis unit 102 sets the previously read coordinate value as an origin, and sets the currently generated direction vector as a new resultant vector (SB111 to SB113). Hereinafter, the same processing is repeated for the plurality of coordinate points specified by the command analysis unit 101.

For example, when the path length illustrated in (c) of FIG. 19 is equal to or greater than the allowable value, the command synthesis unit 102 discards the currently generated resultant vector (a new resultant vector from the start point to the coordinates [x3, y3]). In addition, the command synthesis unit 102 determines a path indicated by the previously generated resultant vector (resultant vector from the start point to the coordinates [x2, y2]) as the machining path ((d) of FIG. 19).

(C) Path synthesis processing performed based on other threshold values

In the above-described embodiment, tolerance and path length are used as an index for determining whether the vector synthesis processing can be executed. However, similar determination can be made using various indices without being limited to these indices. Some examples are shown below.

Feed speed

The command synthesis unit 102 can synthesize a plurality of vectors constituting the machining path set to the same feed speed. For example, a case where the command analysis unit 101 reads an axis movement command J of the following machining program is considered.

Axis movement command J:
G01 X, Y, F =[x1, y1, 200], [x2, y2,], [x3, y3,], [x4, y4, 100], . . . ;

By analysis of the command analysis unit 101, in all paths indicated by a vector from the current position (start point) to the coordinates [x1, y1], a path indicated by a vector from the coordinates [x1, y1] to the coordinates [x2, y2], and a path indicated by a vector from the coordinates [x2, y2] to the coordinates [x3, y3], the same feed speed F=200 is commanded. In this instance, the command synthesis unit 102 generates one resultant vector by synthesizing a plurality of vectors constituting a continuous machining path for which the same feed speed F is commanded. A path indicated by the resultant vector is the machining path. In this example, a path indicated by a vector from the current position (start point) to the coordinates [x3, y3] is a machining path after synthesis, which corresponds to the same result as that in a case where the following axis movement command K is executed.

Axis movement command K:
G01 X, Y, F =[x3, y3, 200], [x4, y4, 100], . . . ;

Spindle rotating speed

The command synthesis unit 102 can synthesize a plurality of vectors indicating machining paths having the same spindle rotating speed (command S). Since specific processing content is the same as that of the vector synthesis based on the above-mentioned feed speed, a description thereof is omitted.

G code

The command synthesis unit 102 can synthesize vectors constituting a plurality of paths having the same G code command. In this instance, only vectors constituting a machining path commanded by a specific G code can also be set as a target for synthesis. For example, the command synthesis unit 102 can set only vectors constituting a machining path commanded by a G code "G01" as a target for synthesis. In this case, vectors constituting a plurality of continuous machining paths for which the G code "G01" is commanded are synthesized. On the other hand, vectors constituting a machining path for which another G code interpolation command such as "G02" is given are not synthesized.

T code, mode command, etc.

The command synthesis unit 102 can synthesize a plurality of vectors constituting a machining path having the same T code (tool exchange) command, that is, a machining path machined by the same tool. In addition, it is possible to synthesize a plurality of vectors constituting a machining path having the same mode command indicating a machining state, etc. Since specific processing content is the same as that of the vector synthesis processing based on the above-mentioned G code, a description thereof is omitted.

Figure 11:
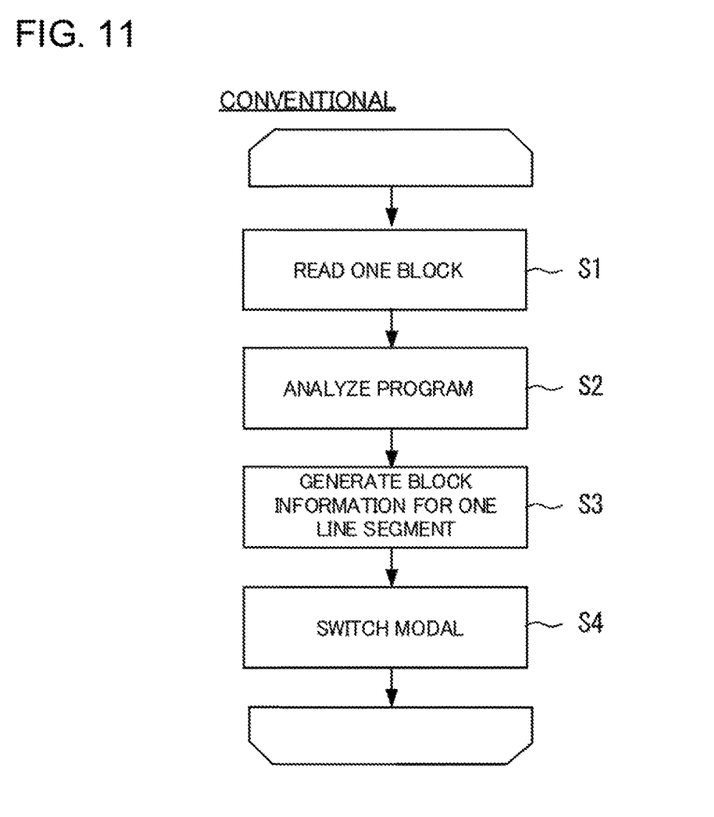
FIG. 11 is a diagram illustrating an operation example of a conventional numerical controller.

An operation of the numerical controller 1 will be described with reference to flowcharts of FIG. 11 and FIG. 12. FIG. 11 is a diagram illustrating an operation of a conventional numerical controller. The conventional numerical controller reads one block of the machining program (S1) and analyzes the read one block of a program (S2). Then, block information of one line segment described in the block is generated (S3). Incidentally, in addition to processing of S1 to S3, the numerical controller performs an ancillary processing such as modal switching or determination of various signals for each block (S4). The numerical controller repeats processing of S1 to S4 for all blocks of the machining program.

Figure 12:
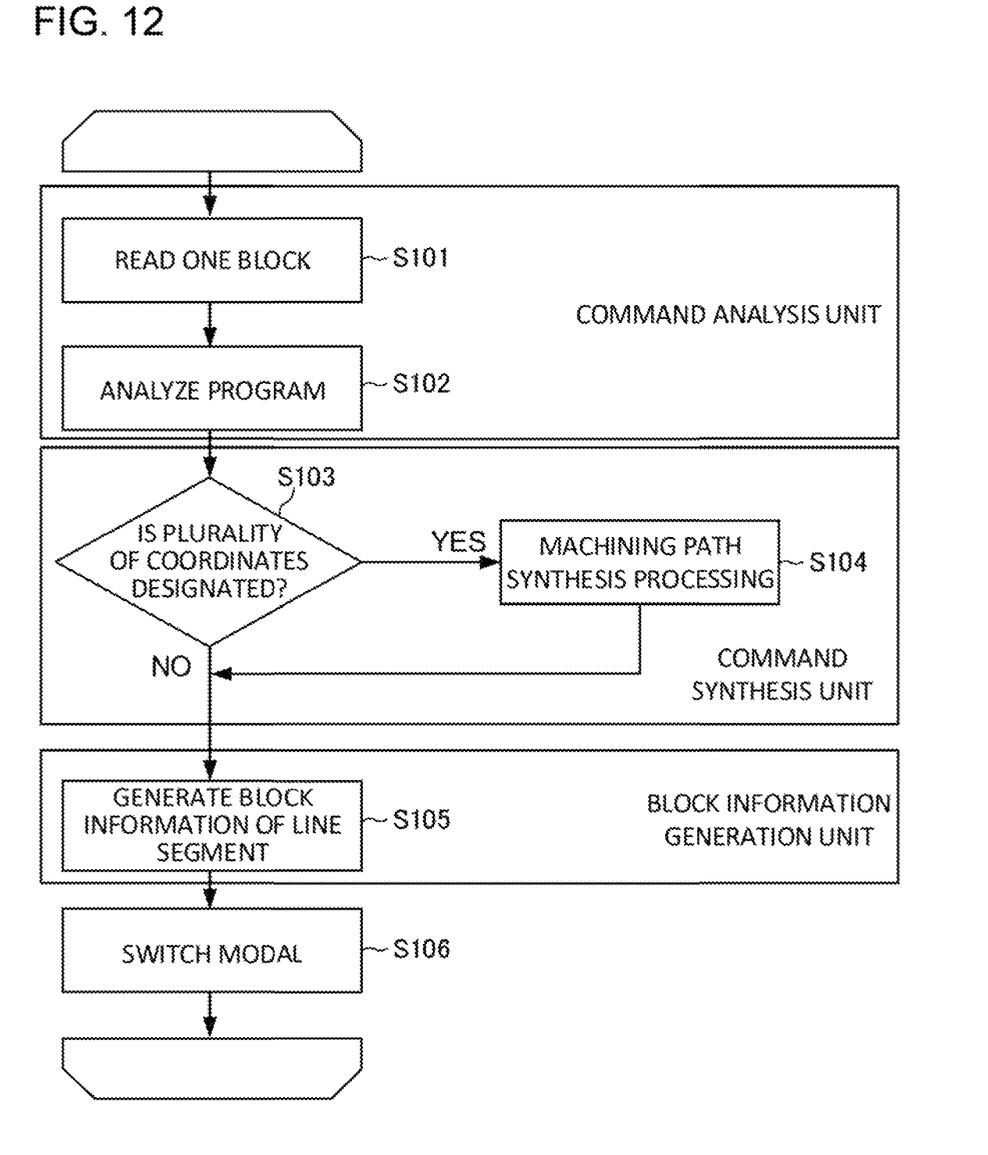
FIG. 12 is a diagram illustrating an operation example of the numerical controller.
Figure 13:
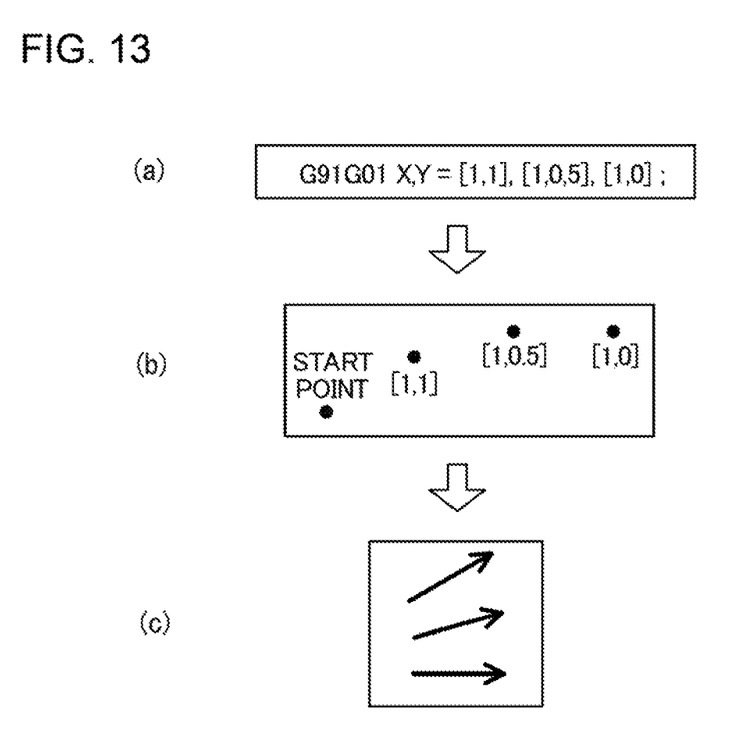
FIG. 13 is a diagram illustrating an operation example of the numerical controller.

FIG. 12 is a diagram illustrating an operation of the numerical controller 1 according to the present embodiment. The command analysis unit 101 of the numerical controller 1 reads one block of the machining program (S101) and analyzes the read one block of a program (S102). Here, when the machining program successively defines line segments of a plurality of sections with a command of one block described according to a format illustrated in (a) of FIG. 13, the command analysis unit 101 analyzes the block and extracts a plurality of coordinate values or movement amounts described in the block (see (b) of FIG. 13).

Figure 14:
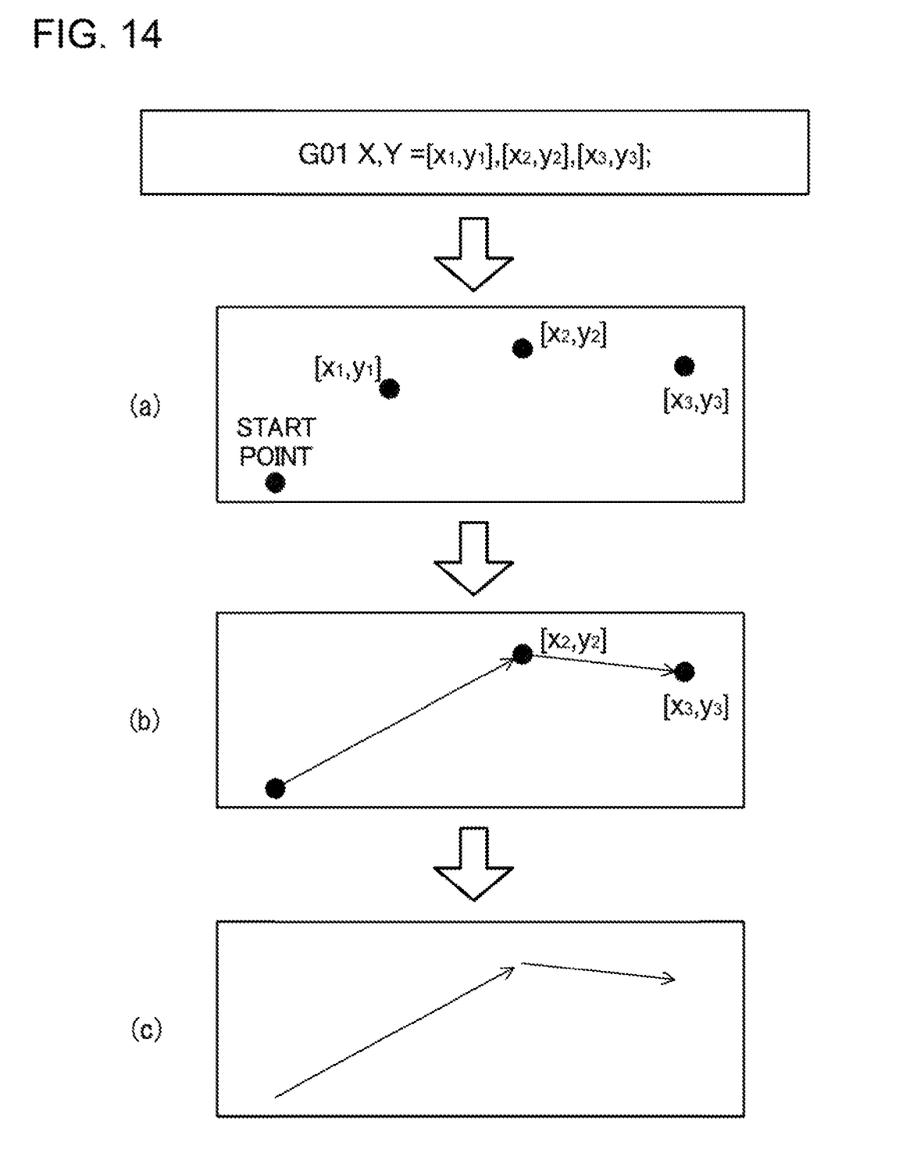
FIG. 14 is a diagram illustrating an operation example of the numerical controller.

When the command analysis unit 101 outputs a plurality of coordinate values (S103), the command synthesis unit 102 generates a machining path based on the coordinate values (see (a) of FIG. 14). In this instance, some of a plurality of direction vectors constituting the original machining path are synthesized and replaced with a simplified machining path (S104) (see (b) and (c) of FIG. 14).

The block information generation unit 103 generates block information of the machining path synthesized by the command synthesis unit 102 (S105). Thereafter, an ancillary processing such as modal switching or determination of various signals is performed (S106), and processing of this block is ended. The numerical controller 1 repeats processing of S101 to S106 for all blocks of the machining program.

According to the present embodiment, the numerical controller 1 can synthesize a plurality of blocks without determining whether a read block is a linear interpolation block each time a program of one block is read and without depending on the maximum number of blocks for prefetch processing.

The disclosure is not limited to the above-described embodiment, and can be modified as appropriate without departing from a spirit of the disclosure.

The invention claimed is:

1. A numerical controller for generating block information of a path by analyzing an axis movement command described in a machining program, the numerical controller comprising:
a command analysis unit for analyzing the machining program in which the axis movement command for a plurality of sections is described in one block in a reading processing for the one block to specify a plurality of coordinate values;
a command synthesis unit for generating a plurality of direction vectors constituting the path based on the plurality of coordinate values and generating a resultant vector obtained by adding the direction vectors; and
a block information generation unit for generating the block information based on the resultant vector.

2. The numerical controller according to claim 1, wherein the command synthesis unit generates the resultant vector when a tolerance related to the resultant vector is less than a predetermined allowable value.

3. The numerical controller according to claim 1, wherein the command synthesis unit generates the resultant vector when a length of the resultant vector is less than a predetermined allowable value.

4. The numerical controller according to claim 1, wherein the command synthesis unit generates the resultant vector when a plurality of the axis movement commands includes the same feed speed or spindle rotating speed.

5. The numerical controller according to claim 1, wherein the command synthesis unit generates the resultant vector when a plurality of the axis movement commands includes a specific and the same G code, T code, or mode command.

* * * * *